United States Patent
Kagohara et al.

(10) Patent No.: US 6,875,290 B2
(45) Date of Patent: Apr. 5, 2005

(54) ALUMINUM BEARING-ALLOY

(75) Inventors: Yukihiko Kagohara, Nagoya (JP);
Takeshi Hoshina, Nagoya (JP); Hideo Ishikawa, Nagoya (JP); Masaaki Sakamoto, Nagoya (JP)

(73) Assignee: Daido Metal Company Ltd., Nagoya (JP)

(*) Notice: Subject to any disclaimer, the term of this patent is extended or adjusted under 35 U.S.C. 154(b) by 0 days.

(21) Appl. No.: 10/264,776

(22) Filed: Oct. 4, 2002

(65) Prior Publication Data

US 2003/0102059 A1 Jun. 5, 2003

(30) Foreign Application Priority Data

Oct. 10, 2001 (JP) ........................................ 2001-312563

(51) Int. Cl.[7] ............................................. C22C 21/02
(52) U.S. Cl. ........................ 148/437; 420/548; 148/691
(58) Field of Search ................................ 148/437, 691, 148/552; 420/548, 529–554

(56) References Cited

U.S. PATENT DOCUMENTS

| | | |
|---|---|---|
| 4,471,029 A | 9/1984 | Fukuoka |
| 4,471,033 A | 9/1984 | Fukuoka |
| 4,645,360 A | 2/1987 | Eastwood |
| 4,857,267 A | 8/1989 | Maki et al. |
| 5,536,587 A | 7/1996 | Whitney, Jr. |
| 6,335,106 B1 | 1/2002 | Steffens et al. |

FOREIGN PATENT DOCUMENTS

| | | |
|---|---|---|
| DE | 197 30 549 C2 | 11/1999 |
| DE | 695 10 360 T2 | 12/1999 |
| DE | 100 56 579 C1 | 5/2002 |
| EP | 0 785 866 B1 | 6/1999 |
| GB | 2121435 A | 12/1983 |
| GB | 2367070 A | 3/2002 |
| JP | 52098611 A | 8/1977 |
| JP | 5247573 A | 9/1993 |
| JP | 08013072 A | 1/1996 |

OTHER PUBLICATIONS

Japanese Abstract– Patent No.: JP58064332; Publication Date: Apr. 16, 1983; Inventor(s), Tatsuhiko, et al.

International Search Report, 6 pages.

Dialog Web, Feb. 19, 2001; "Crankshaft Bearing Shell of a Combustion Engine Used in a Vehicle consists of a Steel/Aluminum Composite Material Having a Steel Support Layer and a Plated Aluminum Alloy Guiding Layer"; Inventor: Claus J, et al.

International Search Report from Germany, 3 pages w/1 page English Translation.

United Kingdom Examination Report under section 18(3) dated May 12, 2004.

Primary Examiner—George Wyszomierski
Assistant Examiner—Janelle Morillo
(74) Attorney, Agent, or Firm—Rader, Fishman & Grauer PLLC

(57) ABSTRACT

An aluminum bearing-alloy containing 1.5 to 8 mass % of Si is provided, in which there can be observed Si grains on the sliding surface of the aluminum bearing-alloy. A fractional area of the observed Si grains having a grain size of less than 4 μm is 20 to 60% of a total area of all the observed Si grains. Another fractional area of the observed Si grains having a grain size of from 4 to 20 μm is not less than 40% of the total area of all the observed Si grains.

2 Claims, 1 Drawing Sheet

ALUMINUM BEARING-ALLOY

CROSS-REFERENCE TO RELATED APPLICATIONS

This application claims priority based on Japanese Application No. 2001-312563, filed Oct. 10, 2001.

BACKGROUND OF THE INVENTION

The present invention relates to an aluminum bearing-alloy for bearings used in high power engines of motor vehicles, general industrial machines and so on.

RELATED ART

There have been used aluminum bearing-alloys usually comprising Sn and/or Pb in order to providing the alloys with conformability. Most of the alloys comprise Sn, since Pb is harmful to the environment and hard to be uniformly dispersed in the alloys.

The aluminum bearing-alloys containing Sn are cast to be a plate, and the plate is bonded to a steel back by roll-bonding to obtain bearings. When producing bearings with the aluminum bearing-alloys, annealing after the roll-bonding process is required in order to improve toughness of the bearing alloys and enhance bond strength between the bearing alloys and the steel back. However, the aluminum bearing-alloys containing Sn have a problem that, when they are subjected to the annealing treatment under a high temperature, aluminum grains and crystallized tin in the alloy structure become coarse, resulting in deterioration of hardness at high temperature and fatigue resistance of the alloys.

Thus, there has been proposed an aluminum bearing-alloy which exhibits excellent fatigue resistance under high load and high temperature and which contains fine hard-particles, for example Si grains each having a size of less than 5 μm, for the purpose of preventing coarsening of Al crystals and crystallized Sn and strengthening of the matrix of Al.

There has been proposed another aluminum bearing-alloy in JP-A-58-64332, in which hard particles are added under the same purpose but a different principle to the strengthening of the Al matrix. The publication teaches to use Si grains as hard particles to be contained and to control the size and the distribution thereof thereby significantly improving bearing properties, especially conformability and anti-seizure property, under high load and high temperature. Specifically, according to the disclosure of the publication, it is possible to obtain coarse Si grains having a size of not less than 5 μm to not more than 40 μm by changing the heat treatment conditions and so on, while most of conventional Si grains have had a size of less than 5 μm, whereby attaining an effect that edges of burrs around nodular graphite grains and projections existing on the surface of a mating shaft are scraped away by the coarse Si grains at the initial stage of a sliding operation to cause the surface of the mating shaft smooth, (herein after, this effect is referred to as "a wrapping effect"), resulting in significantly improved anti-seizure property of the bearing according to which no seizure occurs even under high load.

There is also disclosed in the publication that fine Si grains do not influence on the seizure property of the bearing, while they strengthen the Al matrix to hold the coarse Si grains thereby preventing them from being embedded into the Al matrix during sliding operation. With regard to heat treatment, the publication teaches to subject the alloy to annealing at 350° C. to 550° C. just before roll-bonding in the manufacturing process mentioned above so as to precipitate Si super-saturated in the Al matrix, and it teaches also that Si grains do not become coarse in other processes, for example, annealing after casting, or rolling, and that preferably coarse Si grains in the number of not less than five exist within a unit area of $3.56 \times 10^{-2}$ mm².

With a recent demand for a high-speed engine or a hybrid type engine, there is a tendency that an oil film existing between a bearing and a mating shaft becomes thinner and thus the both members are partially in metal-to-metal contact with each other during operation. It has been generally noticed that hard particles contained in aluminum are uniformly dispersed to strengthen the Al matrix and that the smaller the particle size is the more effective the particles are. In the aforementioned conventional techniques, the former is based on this principle, which is to make the Al matrix to contain Si grains having a size of less than 5 μm. According to an experiment by the present inventors, however, under severe operational conditions such that a bearing and a mating shaft are partially in metal-to-metal contact with each other, there arose problems of wear of the bearing and seizure due to falling off of Si grains such that the small Si grains having a size of less than 5 μm worn together with the Al matrix when there occurred adhesion or abrasion between the Al matrix and the mating shaft by a sliding contact with the shaft.

In the case of the latter in the aforementioned conventional techniques, which is to coarsen the Si grains to have a size of larger than 5 μm, coarse Si grains, which serve to receive a load from a mating shaft, are liable to be trigger points of fatigue crack, so that a bearing according to the latter conventional technique is inferior in fatigue resistance.

The present invention has been accomplished in the light of the above background.

BRIEF SUMMARY OF THE INVENTION

An object of the present invention is to provide an aluminum bearing-alloy excellent in wear and fatigue resistance properties.

As stated above, conventionally, it has been tried to improve the fatigue resistance property by making the Si grains as fine as possible and dispersing those in the Al matrix, or it has been tried to improve the anti-seizure property by making the Si grains as large as possible.

The present inventors have made efforts to improve the bearing performance from the different point of view instead of following the current of prior art. As a result from intense experiments, finally, the inventors found that the wear resistance property can be improved, while improving the fatigue resistance property, in the case where small and large Si grains co-exist in a proper rate, and consequently accomplished the present invention.

The aluminum bearing-alloy based of the present invention comprises 1.5 to 8 mass % of Si, and the balance thereof is substantially aluminum. There can be observed Si grains on the sliding surface of the aluminum bearing-alloy. A fractional area of the observed Si grains having a grain size of less than 4 µm is 20 to 60% of a total area of all the observed Si grains, and another fractional area of the observed Si grains having a grain size of from 4 to 20 µm is not less than 40% to the total area of all the observed Si grains.

The aluminum bearing-alloy may contain 3 to 40 mass % of Sn.

The aluminum bearing-alloy may also contain one or more elements selected of the group consisting of Cu, Zn and Mg in a total amount of 0.1 to 6 mass %.

The aluminum bearing-alloy may further also contain one or more elements selected of the group consisting of Mn, V, Mo, Cr, Ni, Co and W in a total amount of 0.01 to 3 mass %.

Herein below, there will be provided reasons why the above components are contained in the aluminum bearing-alloy in the specific quantities, respectively.

(1) Si: 1.5 to 8 mass %:

Si dissolves in Al matrix and crystallizes as a single substance of Si grains. The crystallized Si prevents aluminum bearing-alloy from adhering to a mating member. In those crystallized elementally, fine Si grains, which are dispersed in the Al matrix, strengthen the fatigue resistance property of the Al matrix, and larger Si grains contribute to improvement of the wear resistance property of the aluminum bearing-alloy. If the Si amount is less than 1.5 mass %, no such effects can be obtained. If the Si amount exceeds 8 mass %, the fatigue resistance property is deteriorated because of an excess amount of larger Si grains. The Si amount is preferably in the range of 3 to 7 mass %.

(2) Sn: 3 to 40 mass %

Sn improves bearing surface properties such as anti-seizure property, conformability and embeddability. If the Sn amount is less than 3 mass %, no such effect can be obtained. If the Sn amount exceeds 40 mass %, mechanical properties of the matrix are deteriorated resulting in deterioration of the bearing performance. The Sn amount is preferably in the range of 6 to 20 mass %.

(3) Cu, Zn, Mg: 0.1 to 6 mass % of one or more of these.

These optional elements are of the additives which improve strength of the Al matrix. They can be forcedly dissolved in the Al matrix by solid solution treatment, and subsequently fine compounds thereof can be precipitated by quenching and aging. Such effect cannot be expected when the amount of the element(s) is less than 0.1 mass % in total. If the amount exceeds 6 mass % in total, the compounds become coarse. The amount of the element(s) is preferably in the range of 0.5 to 5.5 mass % in total.

(4) Mn, V, Mo, Cr, Ni, Co, W: 0.01 to 3 mass % of one or more of these

These optional elements dissolve elementally in the Al matrix, or crystallize as hypercomplex inter-metallic compounds, and improve the fatigue resistance property of the aluminum bearing-alloy. If the amount thereof is less than 0.01 mass %, no such effect can be obtained. If the amount exceeds 3 mass %, conformability of the bearing is deteriorated. The amount is preferably in the range of 0.2 to 2 mass % in total.

(5) Si grains:

A fractional area of Si grains having a grain size of less than 4 µm appearing on a sliding surface of the bearing is 20 to 60% of a total area of all the observed Si grains, and a fractional area of Si grains having a grain size of 4 to 20 µm appearing is not less than 40% of a total area of all the observed Si grains. Si grains improve wear resistance and fatigue resistance of bearings. Si grains having a diameter of less than 4 µm are dispersed in the Al matrix to enhance fatigue resistance strength of the bearing. Si grains having a diameter of 4 to 20 µm bear a load from a mating member, contribute to improvement of the wear resistance property, and improve the anti-seizure property by virtue of the wrapping effect. The Si grains having a diameter of 4 to 20 µm act so as to be compressed into the Al matrix under a load from the mating shaft, so that they are hard to be fallen off. Thus, according to the co-existence of coarse and fine Si grains, there can be obtained the effects that the fine Si grains are not fallen off and the bearing ensures the adhesiveness resistance to the mating member.

In the case where the fractional area of the Si grains having a size of less than 4 µm is less than 20% of the total area of Si grains appearing on a sliding surface, the Al matrix is not well strengthened by the fine Si grains dispersed in the Al matrix because the dispersed Si grains are of a small amount, and the fatigue resistance property of the bearing is deteriorated because the coarse Si grains having a diameter of not less than 4 µm are of an excess amount. In the case where the fractional area of Si grains having a size of less than 4 µm is more than 60% of the total area of all the Si grains (i.e. This means that the fractional area of Si grains having a size of 4 to 20 µm is less than 40% of the total area of all the Si grains.), there exist much amount of the fine Si grains which are liable to be fallen off when being in sliding-contact with the mating member, and there exist a small amount of the larger Si grains which are retained in the Al matrix and bear a load from the mating member, so that the wear resistance property of the bearing is deteriorated. Preferably, the fractional area of Si grains having a diameter of less than 4 µm is in the range of 25 to 45% of the total area of all the Si grains appearing, and the fractional area of Si grains having a diameter of 4 to 20 µm is not less than 55% of the total area of all the Si grains appearing. In addition, preferably, the fractional area of the Si grains having a diameter of 7 to 15 µm is in the range of 15 to 30% of the total area of all the Si grains appearing.

A method of measuring the fractional area of Si grains comprises analyzing a photomicrograph of a sliding surface by means of an image-analyzer, measuring a diameter of every Si grain observed in a sliding surface area of 0.0125 $mm^2$, and calculating an area proportion on the basis of the obtained measurements. With regard to the diameter of respective Si grains, an area of respective Si grain is measured and subsequently a diameter of a circle, of which area is equal to the above measurement, is calculated, which is determined as an equivalent diameter of the measured Si grain.

BRIEF DESCRIPTION OF EMBODIMENTS OF THE INVENTION

Figure 1:
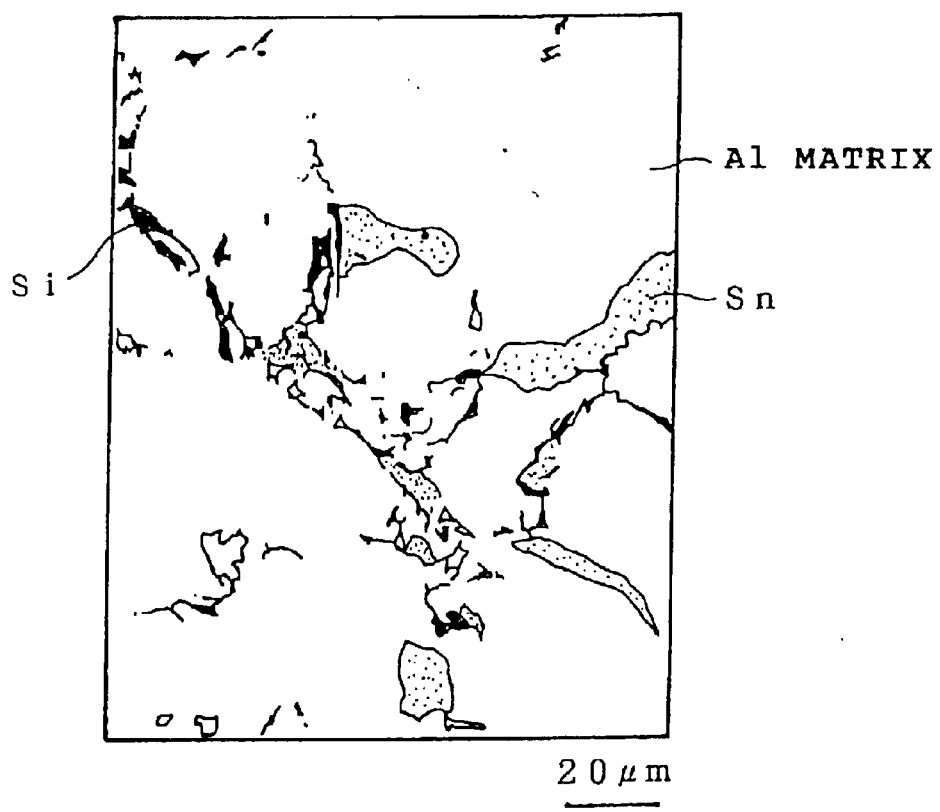
FIG. 1 is a schematic drawing of a photomicrograph showing a bearing-alloy as cast.

Hereinafter, there will be described embodiments of the invention.

A method of producing example bearings is as follows.

(A) Aluminum Bearing-alloy Containing Sn

A Sn-containing aluminum bearing-alloy having a predetermined composition is melted and cast by continuous casting to be a plate having a thickness of 15 mm. As shown in FIG. 1, in the continuously cast plate of the bearing-alloy, Si grains are crystallized at dendrite boundaries of the Al matrix and in a Sn phase.

The continuously cast plate of the aluminum bearing-alloy is subjected to a grinding treatment to remove the surface region in which a segregation occurred, and subsequently to continuous cold rolling to produce a plate having a thickness of 6 mm, followed by annealing to relieve strain and stabilize additive elements.

Thereafter, a thin aluminum sheet as a bonding layer, is bonded to the aluminum bearing-alloy plate by roll-bonding, and subsequently bonded to a steel back to produce a bimetal, followed by annealing to enhance bonding strength between the aluminum bearing-alloy plate and the steel back, and to relieve strain. Optionally, the bimetal is subjected to a solid solution treatment for strengthening the aluminum bearing-alloy, followed by water-cooling and subsequent aging.

The thus produced bimetal is shaped to a semi-circular form, which is a half bearing. A pair of the half bearings is butted to each other to be a cylindrical form for providing an engine bearing.

Here, it should be noted that, in the case of the Sn containing aluminum bearing-alloy, the Si grains, crystallized in the Sn phase as an eutectic structure when casting, are spheroidized and coarsened by annealing after casting. This is because Sn becomes a molten state when annealing and Si grains are liable to be spherical due to an increased surface tension of respective Si grains. While Si grains having an acicular structure are crashed finely to be uniformly dispersed in the Al matrix by repeated rolling and annealing, the respective spherical Si grain in the Al matrix keeps almost its size, whereby a coexistence of fine and large Si grains can be realized.

According to the present invention, the Si grains are made to be a coexistence state of the fine Si grains having a size of less than 4 $\mu$m and the large Si grains having a size of 4 to 20 $\mu$m. The coexistence rate of the fine and large Si grains is such that the fractional area of fine Si grains having a size of less than 4 $\mu$m is 20 to 60% of a total area of all the Si grains appearing on a sliding surface of a bearing, and the fractional area of large grains having a size of 4 to 20 $\mu$m is not less than 40% of the total area of all the Si grains appearing on the sliding surface. In order to control a size of Si grains to the above rates, annealing after casting is carried out in the conditions of 350 to 450° C. of temperature for 8 to 24 hours, preferably 370 to 430° C. for 10 to 20 hours.

(B) Aluminum Bearing-alloy Not Containing Sn

In the case of a Sn-free aluminum bearing-alloy, Si grains are hardly obtained by annealing after casting. Thus, a larger thickness plate is cast, wherein it is cooled slowly, whereby larger Si grains can be crystallized. Thereafter, by controlling works of rolling and roll-bonding, a predetermined rate of coexisting fine and large Si grains can be realized.

Invention examples 1 to 9 and comparative examples 1 to 9 were produced, of which chemical compositions are shown in Table 1. The fractional area rates of Si grains under a boundary grain size of 4 $\mu$m was determined with regard to the respective example. A wear test and a fatigue test were carried out on the examples, of which results are shown in Table 1. Tables 2 and 3 show conditions of the wear test and the fatigue test, respectively. The wear test was carried out by repeating start and stop under a severe condition for promoting wear according to which an initial movement was started from a metal-to-metal contact state.

TABLE 1

| | | | Chemical composition | | | | | | | Diameter of Si grains and the fractional area rate (%) | | Amount of wear | Specific pressure without fatigue |
|---|---|---|---|---|---|---|---|---|---|---|---|---|---|
| | No. | Al | Si | Sn | Cu | Zn | Mg | V | Mn | <4 $\mu$m | 4 $\mu$m $\leq$ | $\mu$m | MPa |
| Invention Examples | 1 | Bal. | 3.0 | 12 | — | — | — | — | — | 52 | 48 | 15 | 110 |
| | 2 | Bal. | 4.0 | 20 | 0.7 | — | 0.1 | 0.2 | — | 29 | 71 | 8 | 120 |
| | 3 | Bal. | 3.5 | 10 | 1.4 | — | — | 0.2 | 0.1 | 43 | 57 | 9 | 120 |
| | 4 | Bal. | 3.0 | 8 | 1.0 | — | — | 0.3 | — | 38 | 62 | 10 | 120 |
| | 5 | Bal. | 7.0 | — | — | — | — | — | — | 25 | 75 | 10 | 120 |
| | 6 | Bal. | 6.0 | — | 1.0 | 4.0 | — | — | — | 40 | 60 | 6 | 130 |
| | 7 | Bal. | 4.5 | — | 0.5 | 3.0 | 0.5 | — | — | 45 | 55 | 10 | 130 |
| | 8 | Bal. | 7.0 | — | 2.0 | — | 1.0 | 0.2 | — | 30 | 70 | 5 | 120 |
| | 9 | Bal. | 5.0 | — | 1.0 | 3.0 | 0.8 | — | 0.1 | 33 | 67 | 7 | 130 |
| Comparative Examples | 1 | Bal. | 3.0 | 12 | — | — | — | — | — | 82 | 18 | 61 | 110 |
| | 2 | Bal. | 4.0 | 20 | 0.7 | — | 0.1 | 0.2 | — | 75 | 25 | 52 | 120 |
| | 3 | Bal. | 3.5 | 10 | 1.4 | — | — | 0.2 | 0.1 | 16 | 84 | 30 | 90 |
| | 4 | Bal. | 3.0 | 8 | 1.0 | — | — | 0.3 | — | 18 | 82 | 23 | 90 |
| | 5 | Bal. | 7.0 | — | — | — | — | — | — | 91 | 9 | 56 | 120 |
| | 6 | Bal. | 6.0 | — | 1.0 | 4.0 | — | — | — | 11 | 89 | 20 | 100 |
| | 7 | Bal. | 4.5 | — | 0.5 | 3.0 | 0.5 | — | — | 86 | 14 | 54 | 130 |
| | 8 | Bal. | 7.0 | — | 2.0 | — | 1.0 | 0.2 | — | 95 | 5 | 68 | 120 |
| | 9 | Bal. | 5.0 | — | 1.0 | 3.0 | 0.8 | — | 0.1 | 74 | 26 | 40 | 130 |

*Note: "Bal." means "Balance".

TABLE 2

| Wear Test | Conditions |
| --- | --- |
| Peripheral speed | 1.7 m/sec |
| Test load | 4.0 MPa |
| Test time | 20 hours |
| | 1 cycle (from a start to a stop) of 4 seconds |
| Lubricant | VG10 |
| Shaft material | JIS S55C |
| Evaluation method | Measuring of an inner diameter change |

TABLE 3

| Fatigue Test | Conditions |
| --- | --- |
| Peripheral speed | 9.0 m/sec |
| Test time | 20 hours |
| Lubricant | VG68 |
| Oil feed temperature | 100° C. |
| Oil feed pressure | 0.49 MPa |
| Shaft material | JIS S55C |
| Evaluation method | Maximum specific pressure without fatigue |

As will be apparent from the test results shown on Table 1, invention examples 1 to 9 are excellent both in the wear and fatigue resistance properties. Especially, invention examples 2 to 9 are excellent the both properties of wear resistance and fatigue resistance, which contain the fine Si grains of less than 4 μm having the fractional area rate of 25 to 45%, or the large Si grains of not less than 4 μm having the fractional area rate of not less than 55%.

In contrast, comparative examples 1, 2, 5, 7, 8 and 9 are poor in the wrapping effect to a mating member since they contain much fine Si grains which are liable to be fallen off by sliding-contact with the mating member, and inferior in wear resistance since they contain a small amount of large Si grains, which bear a load from the mating member, resulting in that the Al matrix is liable to adhere to the mating member.

Comparative examples 3, 4, and 6 are inferior in fatigue resistance since they contain a small amount of the fine Si grains of less than 4 μm and a much amount of the large Si grains of not less than 4 μm, resulting in increased trigger points of fatigue cracks.

What is claimed is:

1. An aluminum bearing-alloy consisting of 1.5 to 8 mass % of Si, 3 to 40 mass % of Sn, at least one element selected from the group consisting of Cu, Zn and Mg in a total amount of not more than 6 mass %, at least one element selected from the group consisting of Mn, V, Mo, Cr, Ni, Co and W in a total amount of not more than 3 mass %, and the balance thereof is substantially aluminum, and wherein said alloy has observed Si grains on a sliding surface of the aluminum bearing-alloy, wherein a fractional area of the observed Si grains having a grain size of less than 4 μm is 20 to 60% of the total area of all the observed Si grains, and another fractional area of the observed Si grains having a grain size of from 4 to 20 μm is not less than 40% of the total area of all the observed Si grains, and wherein the above distribution of Si grains is achieved by subjecting a cast plate made of the aluminum bearing-alloy to annealing and subsequent rolling.

2. A method of producing an aluminum bearing-alloy consisting of 1.5 to 8 mass % of Si, 3 to 40 mass % of Sn, at least one element selected from the group consisting of Cu, Zn and Mg in a total amount of not more than 6 mass %, at least one element selected from the group consisting of Mn, V, Mo, Cr, Ni, Co and W in a total amount of not more than 3 mass % and the balance thereof is substantially aluminum, the method comprising the steps of:

subjecting a cast plate made of the aluminum bearing-alloy to annealing at a temperature of 350 to 450° C. for 8 to 24 hours thereby coarsening Si grains contained in the aluminum bearing-alloy; and subsequently subjecting the annealed plate to rolling resulting in a predetermined distribution of the Si grains, such that said alloy has observed Si grains on a sliding surface of the aluminum bearing-alloy, wherein a fractional area of the observed Si grains having a grain size of less than 4 μm is 20 to 60% of the total area of all the observed Si grains, and another fractional area of the observed Si grains having a grain size of from 4 to 20 μm is not less than 40% of the total area of all the observed Si grains.

* * * * *